Nov. 1, 1966   H. D. CUKLANZ   3,281,996
SAW BLADE
Filed April 27, 1964
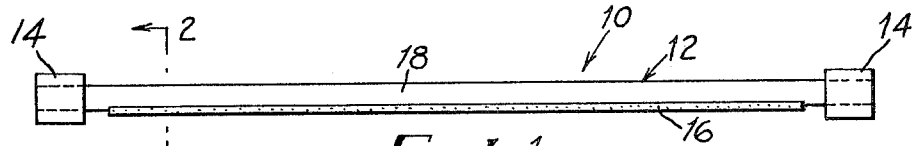
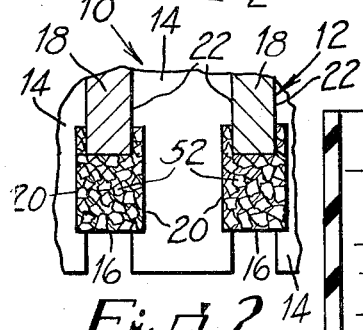
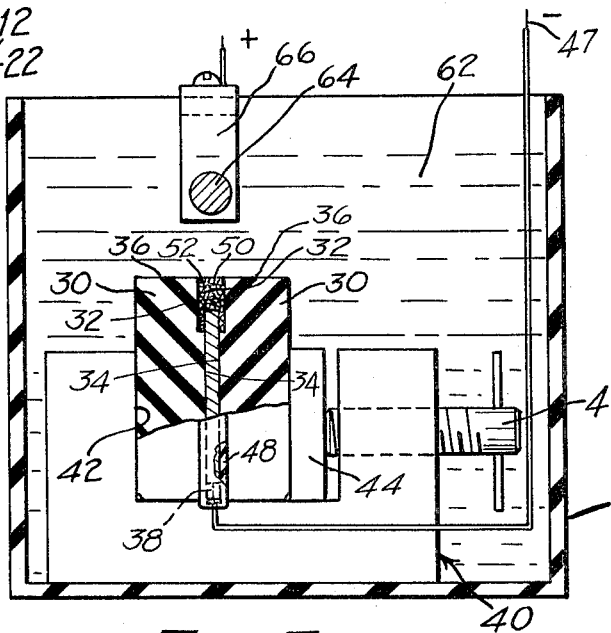
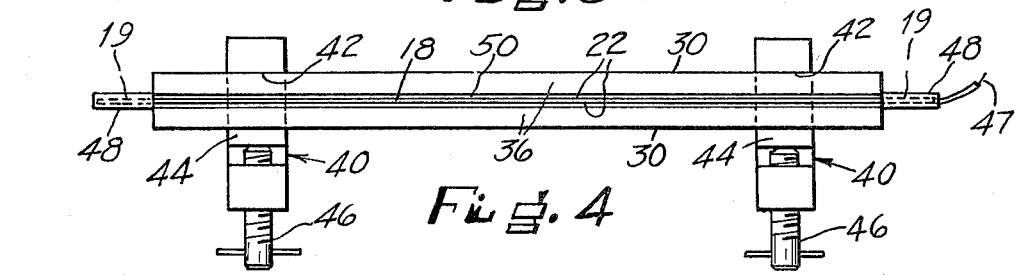
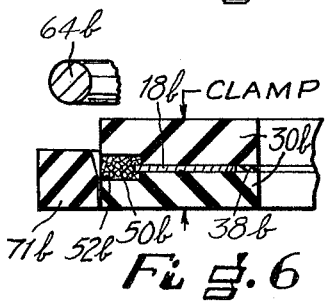
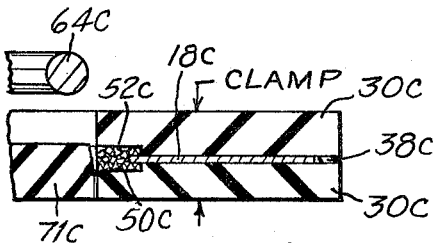
INVENTOR
HARLAN D. CUKLANZ
BY Lewis M. Smith, Jr
ATTORNEY

United States Patent Office 3,281,996
Patented Nov. 1, 1966

3,281,996
SAW BLADE
Harlan D. Cuklanz, Worcester, Mass., assignor to Norton Company, Worcester, Mass., a corporation of Massachusetts
Filed Apr. 27, 1964, Ser. No. 362,834
16 Claims. (Cl. 51—204)

This invention relates to very thin metal bonded abrasive cutting tools and to a method of producing such tools to precise dimensions. More particularly, this invention relates to diamond abrasive saw blades of various types especially useful for cutting thin wafers of hard material such as silicon and germanium for use in the manufacture of electronic components.

The various types of saw blades presently in use for this purpose include rotatable thin circular saws which have either an outer annulus of diamond abrasive on their periphery or an inner annulus of diamond abrasive extending around the periphery of a large central hole through the saw, and also include reciprocable thin elongated metal saw blades which may either be plain metal strips used with an abrasive slurry or be provided with a fixed diamond abrasive portion extending along at least one edge thereof.

Since such saws are frequently used in applications which call for cutting extremely hard materials into sections a few thousandths of an inch thick within critical dimensional limits both for thickness and for parallelism of the opposed faces and with a very smooth surface finish, it has proved to be extremely difficult to provide saw blades consistently capable of making the required cuts in large quantities within the dimensional limits desired. For example, these saw blades may be required to cut wafers less than ten thousandths of an inch thick within one thousandth of the desired thickness, parallel within three ten thousandths, and with a surface free of visible cutting lines, a convenient measure of a surface so smooth that a subsequent lapping operation is not required.

The accuracy of the cuts made by the known circular saws provided with a diamond abrasive portion has been limited by the fact that diamond particles which vary somewhat in shape and size are disposed in various orientations along both sides of the abrasive portion of the saw, regardless of the manner in which the diamond abrasive particles have been attached to the saw blade. The same problem obtains for the same reason when diamond particles are adhered to the narrow edge and to adjacent portions of the sides of a thin elongated blade by electrodeposition of a metal bond in the manner already known in the art.

The effort to provide satisfactory saw blades for such applications has been made more difficult by the fact that many of the materials cut by such saw blades are relatively expensive, so that these saw blades must be made as thin as possible in order to minimize the kerf loss in the multiple cuts required to product large numbers of thin wafers from an ingot of such material, for example, up to sixty wafers per inch from an ingot an inch or more in diameter and several inches long.

Accordingly, it is the principal object of this invention to provide various types of very thin saw blades with cutting portions comprising fine abrasive particles secured to the saw blades by a metal bond, wherein the cutting portion of each saw blade is characterized by a precisely controlled critical dimension between its side surfaces, by its symmetrical orientation relative to the supporting portion of the saw blade, and by the disposition of the abrasive grits adjoining its side surfaces.

It is a further object of this invention to provide a simple and reliable method of producing various types of very thin saw blades in quantity, all having cutting portions made to the same precisely controlled critical dimension and precisely oriented symmetrically relative to the supporting portions of the saw blades.

It is yet another object of this invention to provide various types of very thin saw blades having cutting portions very accurately oriented relative to their supporting portions and with their critical dimensions precisely controlled so that such saw blades may be installed readily in suitable machines to make very accurate precisely located multiple cuts through hard materials in order to produce extremely thin sections of such materials.

It is yet another object of this invention to provide various types of thin saw blades with cutting portions including high concentrations of abrasive particles so oriented that the saw blades can cut into or through hard base materials without chipping the edges of the material along the cut and without dislodging thin coatings on such base material.

Briefly, each saw blade of the various types contemplated by this invention consists of a thin metal support to one edge of which is bonded a cutting portion of the same thickness as or slightly thicker than the metal support with the sides of the cutting portion parallel to the sides of the metal support. In each case, the cutting portion is precisely located symmetrically with respect to the metal support and contains multiple layers of abrasive grits, all or part of which may be diamond particles, immobilized and secured to the metal support by a metal bond such as nickel.

In the preferred method for manufacturing such saw blades the thin metal support is clamped between opposed electrically nonconductive plates with an edge of the support exposed within a cavity formed by portions of the plates extending beyond the exposed edge of the thin metal support. This cavity is filled with fine abrasive grits for example, diamond particles, leaving interstices determined by the size, shape, and orientation of the grits.

In order to secure the fine abrasive grits in a configuration with precisely controlled critical dimensions in precisely controlled symmetrical relation to the thin metal support, the clamped assembly described above is placed in a tank of electrolyte adjacent to a suitably shaped anode with the anode connected to a source of direct current and with the thin metal support connected to the source of direct current so that it functions as a cathode. The electrolytic process is continued at a controlled rate until a metal bond builds up in continuous phase on the thin metal support and around the fine abrasive grits within the cavity so that the metal bond secures the fine abrasive grits in continuous phase within the cavity and to a predetermined minimum distance beyond the exposed edge of the thin metal support.

The fine abrasive grits are described herein as secured in continuous phase in the sense that the fine abrasive grits are interdependently supported within the cavity with each grit touching contiguous grits, and the metal bond is described as deposited in continuous phase because it fills interconnected interstices between the respective fine abrasive grits.

The instant invention will be more readily understood by reference to the accompanying drawings wherein the respective reference numerals refer to like or corresponding parts. Referring now to the respective views illustrated in the drawings, FIG. 1 is a side elevation of a series of thin elongated reciprocable saw blades made in accordance with the instant invention, disposed in operative relation to a series of pairs of intervening spacers, FIG. 2 is an enlarged partial cross section taken on line 2—2 of FIG. 1, FIG. 3 is an enlarged end view, partially in cross section, of suitable apparatus for producing an individual saw blade of the type illustrated in FIGS. 1 and 2 according to the teachings of the instant invention, FIG. 4 is a plan view on a reduced scale of the apparatus for supporting and shielding the thin metal supporting portion of an elongated reciprocable saw blade for the application of an abrasive cutting portion thereto according to the teachings of the instant invention, FIG. 5 is a partial cross section of a saw blade manufactured according to the instant invention which has a modified abrasive cutting portion, FIG. 6 is an enlarged partial cross section showing a portion of the thin metal supporting portion of a circular saw blade and the abrasive portion secured to its outer periphery both disposed between a clamped pair of opposed circular electrically nonconducting plates arranged to support and shield the thin metal supporting portion of a circular saw blade and to support the fine abrasive grits during the electrodeposition of a metal bond to form the abrasive cutting portion of a circular saw blade according to the teachings of the instant invention, and FIG. 7 is an enlarged partial cross section showing a portion of the thin metal supporting portion of an annular saw blade and the abrasive portion secured to the periphery of a central hole through the metal portion both disposed between a clamped pair of opposed annular electrically non-conducting plates arranged to shield and support the thin metal supporting portion of an annular saw blade and to support the fine abrasive grits during the electrodeposition of a metal bond to form the abrasive cutting portion of an annular saw blade according to the teachings of the instant invention.

The instant invention will be described first in relation to the configuration of the saw blade illustrated in FIGS. 1 through 4, that is the elongated reciprocable saw blade adapted to be used in a ganged arrangement, as illustrated in FIGS. 1 and 2, in a multiple blade wafering machine of the type described and illustrated in U.S. Patent No. 3,079,908, thus eliminating the need for the use of an abrasive slurry as a cutting agent. Large numbers of loose blades and spacers may be assembled and secured in such wafering machines in the operative relation illustrated in FIGS. 1 and 2. Alternatively, in order to facilitate the installation of large numbers of blades in such machines, the blades and the intervening pairs of spacers may be prepackaged for this purpose in the manner described and illustrated in copending application Ser. No. 194,356, now Patent No. 3,168,087.

In FIGS. 1 and 2 of the drawings, reference numeral 10 generally designates an assembly of multiple elongated parallel thin saw blades 12 maintained parallel by intervening pairs of thin spacers 14 disposed adjacent the respective ends of the blades 12.

In use, the ends of the blades 12 are secured between adjacent spacers 14 either by transverse clamping as described in Patent No. 3,079,908 or by prepackaging the multiple blade assemblies as described in copending application Ser. No. 194,356, now Patent No. 3,168,087, so that the blades can be tensioned lengthwise by relative displacement of the respective series of intervening spacers to maintain the blades straight, parallel and relatively rigid. With the blades 12 so tensioned they are maintained straight, parallel and relatively rigid across the space between the respective series of spacers, so that they resist deflection when a work piece to be cut is forced against the cutting edges of the saw blades.

In such an application a large number of blades 12 are cutting one or more work pieces simultaneously to critical limits with respect to tolerance and parallelism. Accordingly, all of the blades 12 should be provided with identical precisely oriented abrasive cutting portions 16 so that all of the blades 12 will cut kerfs of the same predictable width within very close limits to produce wafers or dice to precisely controlled uniform dimensions.

In order to satisfy these requirements, these blades must be manufactured in such a way that the abrasive cutting portion 16 of each saw blade 12 is positioned symmetrically of the thin metal supporting portion 18 and so that the sides 20 of the abrasive cutting portion 16 are parallel with each other and with the sides 22 of the metal supporting portion 18.

The apparatus for producing an elongated reciprocable saw blade 12 which meets these requirements includes a pair of elongated identical plates 30 made of a rigid electrically nonconducting material such as glass, plastic, or the like. In the configuration illustrated in FIGS. 3 and 4, the respective plates 30 have identically formed recesses including side surfaces 32 parallel to the surfaces 34 thereof which engage the sides 20 of the thin metal supporting portion 18 when it is clamped between the plates 30 as shown in FIGS. 3 and 4. The identical recesses in the respective plates 30 also have bottom surfaces interconnecting side surfaces 32 and surfaces 34 which are equidistant from the edge surfaces 36 of the respective plates 30. For example, the distance from the surface 34 to the side surface 32 may be one thousandth of an inch, and the bottom surfaces of the recesses may be 10 thousandths of an inch from the edge surfaces 36.

The elongated plates 30 may be substantially shorter than the thin metal supporting portion 18 of a blade 12 engaged thereby since the abrasive cutting portion 16 of the saw blade 12 formed between the plates 30 need only be long enough to engage a work piece or work pieces being cut during at least part of the stroke through which the blade is reciprocated. In any case, elongated blades intended to be ganged using intervening spacers 14 should be provided with abrasive cutting portions which stop sufficiently short of the ends of the blades to accommodate the spacers 14. On the other hand, the transverse dimension of the plates 30 is selected so that the plates 30 cover the entire width of the thin metal supporting portion 18 and so that the edge surfaces 36 project a predetermined distance above one edge of the metal supporting portion 18 to provide the cavity in which the abrasive cutting portion 16 is formed.

The metal supporting portion 18 is clamped between the surfaces 34 of the plates 30 so that its lower edge rests against an elongated stop 38 of electrically nonconducting material supported with and between plates 30 upon a pair of spaced nonconducting clamps illustrated in FIGS. 3 and 4. With the metal supporting portion 18 positioned so that its exposed ends 19 projects beyond the opposite ends of the plates 30, the plates 30, the stop 38, and the metal supporting portion 18 are clamped between the fixed jaws 42 and the movable jaws of the clamps 40 by rotating the screws 46. After an insulated electrical conductor 47 is placed in electrical contact with the metal supporting portion 18, for example at one exposed end 19, the exposed ends 19 are covered with an electrically nonconducting insulating coating 48, for example by dipping them into an air hardening liquid insulating material or by taping them with electroplater's tape. The coating 48, which must be easy to strip from the metal supporting portion 18, should also be built up sufficiently adjacent to the edge surfaces 36 of the plates 30 to close off the ends of the cavity 50 formed by the opposed recesses including side surfaces 32 when the metal supporting portion 18 is clamped between the plates 30 as shown best in FIG. 3. By this means all of the surfaces of the metal supporting portion 18 except the surfaces to which the abrasive cutting portion 16 is to be bonded are masked to preclude the electrodeposition of metal thereon.

Next, the narrow cavity 50 is filled to the level of the edge surfaces 36 with fine abrasive grits 52, for example, diamond particles of the desired size within the range between 220 and 500 grit sizes. The abrasive grits 52 deposited in the cavity 50 form a multilayer mass of interdependent particles supported by the thin metal supporting portion 18 and by the plates 30 with the outermost extremities of particles adjacent to the side surfaces 32 coincident with one of a pair of parallel planes defined by these side surfaces and also parallel to the sides of the metal supporting portion 18.

The clamped assembly with the cavity 50 filled with abrasive grits 52 is then placed in a non-conducting tank 60 filled with an electrolyte 62 as shown in FIG. 3. The insulated conductor 47 in electrical contact with the metal supporting portion 18 is connected to the negative side of a source of direct current, so that portion 18 serves as a cathode. An anode 64 preferably coextensive with the open side of the cavity 50 and made of the desired bonding metal is suspended in the electrolyte 62 so that it is spaced from and generally parallel to the open side of the cavity 50. The anode 64 may conveniently be supported by a pair of brackets 66, one of which is shown in FIG. 3, which are supported on the opposite ends of the tank 60. An electrical conductor 68 electrically connected to the anode 64, for example through one of the brackets 66 as shown in FIG. 3, is connected to the positive side of the source of direct current.

With the apparatus arranged as described above, the bonding metal released from the anode 64 penetrates the interconnected interstices between the abrasive grits 52 and starts to build up on the exposed surfaces of the metal supporting portion 18. As the electrolytic process continues at a carefully controlled rate, the bonding metal continues to be deposited until it eventually fills all of the space within the cavity 50 not already occupied by the abrasive grits, thereby immobilizing the abrasive grits and securing them to the metal supporting portion 18 to which the bonding metal is adherent.

In order to assume the build-up of the bonding metal between the abrasive grits throughout the cavity 50, it is necessary to maintain the cathode current density very low, particularly until the bonding metal is built up beyond the edge of the metal supporting portion 18 when the bottom of the cavity 50 lies below this edge. Depending on the configuration of the cavity containing the abrasive grits, a cathode current density initially as low as one hundredth amps per square foot of cathode area may be required in order to insure the proper build-up of the bonding metal.

When all of the abrasive grits within the cavity 50 have been immobilized by the electrodeposition of bonding metal, the abrasive cutting portion 16 of the saw blade 12 is completely formed including planar parallel side surfaces 22 formed by the side surfaces 32 of the plates 30. At this point the electrolytic process is stopped, the clamping apparatus is removed from the tank 60, the covering 48 is stripped from the blade 12, and the finished blade 12 is removed from between the plates 30.

In the preferred embodiment illustrated in FIGS. 1 through 4, the upper edge of the metal supporting portion 18 projects into a relatively wider cavity 50 so that the finished saw blade 12 is shaped as shown in FIGS. 2 and 3 to include an abrasive cutting portion 16 of greater width than the thickness of the metal supporting portion 18, so that its side surfaces 20 are offset from the side surfaces 22 of the metal supporting portion 18, and so that the bonding metal is adherent not only to the edge but also to adjacent portions of the side surfaces of the metal supporting portion 18. However, by using a pair of electrically nonconducting plates 30a in which the surfaces 34 intersect the edge surfaces 36 without intervening recesses including offset side surfaces 32, the saw blade 12 may be shaped alternatively as shown in FIG. 5 to include an abrasive cutting portion 16 with a width equal to the thickness of the metal supporting portion 18a, so that its side surfaces 20 are coplanar with the side surfaces 22 of the metal supporting portion 18a, and so that the bonding metal is adherent only to the narrow edge of the metal supporting portion 18a.

For example, the process described above has been employed to manufacture a thin elongated saw blade including a thin metal support 9" long by 3/16" high and .008" thick using plates 30 which when clamped around the metal supporting portion 18 formed an elongated cavity 50 about 7" long and 10 thousandths of an inch wide by 10 thousandths of an inch deep disposed symmetrically about the central plane of the metal supporting portion 18. The cavity was filled with about a 200 concentration of diamond particles with maximum dimensions not greater than 25 ten thousandths of an inch. The clamped assembly was immersed in an electrolyte consisting of 60 ounces per gallon of nickel sulfamate, 10.2 ounces per gallon of nickel metal, 5 ounces per gallon of boric acid, and 5 hundredths ounces per gallon of an anti-pitting agent. The electrolyte was maintained at a temperature of 120° F. and had an electronic pH reading of 4. An anode of 99+ rolled and depolarized nickel was submerged in the electrolyte so that it was disposed above and extended along the length of the cavity 50. With the anode and the cathode connected to a source of direct current as described above, the electrolytic action was allowed to continue for approximately 6 hours at 2 volts with a cathode current density of 5 amperes per square foot of cathode area so that the nickel was built up around the diamond particles throughout the cavity 50. At this point the electrolytic process was stopped, the clamped assembly was removed from the tank, and the plates 30 and the covering 48 were removed from the finished blade 12.

The same general procedure may be employed to manufacture thin circular saw blades with an annular abrasive cutting portion adhered either to the periphery of a thin circular metal supporting portion or to an annular thin metal supporting portion around the periphery of a central hole therethrough.

Referring particularly to the showing in FIG. 6, it will be evident that the manufacture of a circular saw blade with a peripheral abrasive cutting portion 16 requires the use of a pair of electrically nonconducting circular plates 30a of a diameter large enough to extend symmetrically beyond the periphery of a thin circular metal supporting portion 18b to form an annular cavity 50b with a constant cross section corresponding to that of the cavity 50 illustrated in FIG. 3. If the metal supporting portion 18b is provided with a central mounting hole as indicated in FIG. 6, the inner edge of the metal supporting portion 18b may be masked by an annular insulating ring 38b or otherwise by an air hardening liquid coating or electroplater's tape.

Referring now to the showing in FIG. 7, it will be evident that the clamping apparatus required for the manufacture of an annular saw blade with an abrasive cutting portion on its inner edge is similar to that required for the manufacture of a circular saw blade arranged as shown in FIG. 6, except that the pair of electrically nonconducting circular plates must be shaped so that they extend symmetrically beyond the inner edge of the annular thin metal supporting portion 18c to form an annular cavity 50c with a constant cross section corresponding to that of cavity 50 illustrated in FIG. 3. The outer edge of the metal supporting portion 18c may be shielded by an insulating ring 38c or other suitable means.

The annular cavities 50b and 50c can be modified so that their cross sections are shaped like that of cavity 50a shown in FIG. 5, or otherwise, by substituting modified plates 30b or 30a.

When circular metal supporting portion 18b or 18c has been clamped between the required plates 30b or 30c, the annular cavity 50b or 50c can be filled with abrasive particles 50 by orienting the metal supporting portion vertically to fill the successive portions of the cavity which face upwardly as the clamping apparatus is rotated about a horizontal axis, since abrasive grits of the size used tend to remain within the cavity 50 regardless of its orientation until the clamped assembly is immersed in the electrolyte.

In order to keep the cavity 50b filled with interdependent abrasive grits during the electrodeposition of the bonding metal, the lower circular plate 30b is encircled by a closely-fitting electrically nonconducting barrier ring 71b, shaped so that it also encircles the annular cavity 50b and having its circular inner surface tapered as shown in FIG. 6 so that the inner edge of ring 71b is spaced about 6 thousandths of an inch from the periphery of the upper circular plate 30b. The small space between the barrier ring 71b and the cavity 50b may be filled with excess abrasive grits 52 to preclude displacement of abrasive grits from the cavity 50b.

Similarly, to keep the cavity 50c filled with interdependent abrasive grits during the electrodeposition of the bonding metal, the lower annular plate 30c is fitted with a snugly fitting barrier plug 71c as shown in FIG. 7, shaped so that it extends above the annular cavity 50c and having its outer surface tapered so that the outer edge of the barrier plug 71c is spaced about 6 thousandths of an inch from the inner edge of the upper annular plate 30c. The small space between the barrier plug 71c and the cavity 50c may be filled with excess abrasive grits 52 to preclude displacement of abrasive grits from the cavity 50c.

The bonding metal may be introduced into the cavity 50b by electrodeposition using a circular anode 64b disposed substantially as shown in FIG. 6. Likewise the bonding metal may be introduced into the cavity 50c by electrodeposition using a circular anode 64c disposed substantially as shown in FIG. 7.

Various other modifications of the saw blades described herein and of the apparatus used to manufacture these saw blades according to the instant invention are contemplated within the scope of the appended claims.

For example, while the fine abrasive grits used to manufacture the various types of saw blades according to the instant invention may consist entirely of diamond particles as indicated above, they may alternatively consist of other material such as aluminum oxide or silicon carbide, or the like, or they may consist of a mixture in predetermined proportions of diamond particles and particles of other abrasive material. In any case, the material selected for the abrasive grits should be that which produces the best cutting action for the particular application involved.

For convenience, the electrical conductor to be connected to the metal supporting portion of any type of saw blade manufactured according to this invention may be embedded in one of the nonconducting plates so that it is positioned in electrical contact with the metal supporting portion when the metal supporting portion is clamped between a pair of opposed nonconducting plates.

Moreover, it will be obvious that a series of similar saw blades can be manufactured simultaneously in a single tank by clamping a series of thin metal supporting portions for a given type of saw blade between an alternate series of electrically non-conducting plates shaped on both sides to form the desired cavity along at least one edge of each of the interfitted thin metal supporting portions. After all of the cavities are filled with fine abrasive grits, the manufacture of the series of blades can be completed by the simultaneous deposition of bonding metal in all of the cavities in the manner described above.

In all of the different arrangements described above the clamped nonconducting precisely formed plates serve to mask off surfaces of the metal supporting portion except those to which the abrasive is to be bonded, to maintain the thin metal supporting portion flat and rigid, to provide a cavity with sides that are parallel to extremely close limits, to produce a symmetrical cavity to very close tolerance with side surfaces equidistant from the center of the metal supporting portion, to provide a narrow cavity of constant width in which multiple abrasive grits are aligned by the walls of the cavity, to provide a cavity which limits the extent of deposited bonding metal to the precisely controlled space between the sides of the cavity, and thereby to produce a thin abrasive cutting portion of precisely controlled constant width which will cut a kerf of constant width during the life of the abrasive cutting portion.

For all of the types of thin saw blades described and illustrated in this application, the process for manufacturing the abrasive cutting portion to precisely controlled dimensions and adherent to the metal supporting portion of a saw blade is essentially the same for any blade configuration, taking into account the need for carefully controlling the rate of electrodeposition so that the metal bond is deposited throughout the space within the cavity not already occupied by the abrasive grits. In practice, the rates suitable for this purpose have been achieved by employing a cathode current density in the range between an initial low level of 100 amps per square foot of cathode area and a level of 5 amps per square foot of cathode area determined empirically dependent upon the dimensions and the configuration of the saw blade being manufactured by this process and upon the characteristics of the equipment used to perform this process.

In addition, certain saw blade configurations including those illustrated in FIGS. 6 and 7 in which the shape of the cavity containing the abrasive grits is such that its entire open side cannot be diposed to maintain the abrasive grits within the cavity without supplemental restraining means, the basic process described must be augmented by a suitably shaped non-conducting barrier such as the ring illustrated in FIG. 6 or the plug illustrated in FIG. 7 arranged to screen the open side of the cavity.

I claim:

1. A thin abrasive saw comprising a thin metallic support having a narrow edge surface, a cutting portion adjoining said narrow edge surface consisting of at least two layers of abrasive grits disposed in continuous phase between spaced planar side surfaces both substantially perpendicular to a cutting surface generally parallel to said narrow edge surface whereby the outer extremities of all of the abrasive grits adjoining the respective planar side surfaces of said cutting portion are coincident with one of said planar side surfaces, and an electrodeposited bond material in continuous phase interlacing said abrasive grits and adherent to said thin metallic support.

2. A thin abrasive saw as described in claim 1, wherein said abrasive grits consist entirely of diamond particles.

3. A thin abrasive saw as described in claim 1, wherein said abrasive grits consist of diamond particles and other abrasive particles uniformly intermixed in predetermined proportions.

4. A thin abrasive saw comprising a thin metal support of constant thickness having planar side surfaces interconnected by a narrow edge surface, a cutting portion adjoining said edge surface and having spaced planar side surfaces parallel to the side surfaces of the metal support, said cutting portion consisting of abrasive grits disposed in continuous phase between the side surfaces of the cutting portion whereby all of the abrasive grits immediately adjacent the respective planar side surfaces of said cutting portion have outermost extremities coincident with one of the planar side surfaces of said cutting portion, and an electrodeposited bonding metal in continuous phase interlacing the abrasive grits and adherent to said thin metal support.

5. A thin abrasive saw comprising a thin metal support having parallel side surfaces interconnected by a narrow edge surface, a thin cutting portion of precisely controlled constant thickness and of predetermined substantially constant minimum depth mounted symmetrically upon said thin metal support along said edge surface, said cutting portion consisting of interdependent fine abrasive grits disposed in continuous phase between flat side surfaces parallel to the side surfaces of said thin metal support, whereby the minimum depth of said cutting portion spans multiple layers of abrasive grits and all of the abrasive grits immediately adjacent the side surfaces of said cutting portion have outermost extremities coincident with one of the flat side surfaces of said cutting portion, and electrodeposited bonding metal in continuous phase immobilizing said abrasive grits and adherent to said thin metal support.

6. A thin abrasive saw comprising a thin metal support having parallel side surfaces interconnected by a narrow edge surface, a cutting portion of constant width greater than said metal support and of a predetermined minimum height adjoining said edge surface and having respective side surfaces parallel with and spaced equidistant from the respective side surfaces of the metal support, said cutting portion consisting of multiple layers of abrasive grits interdependently disposed in continuous phase throughout the space between the side surfaces of said cutting portion whereby all of the abrasive grits immediately adjacent the side surfaces of said cutting portion have outermost extremities coincident with one of the side surfaces of said cutting portion, and electrodeposited bonding metal in continuous phase interfitting the abrasive grits throughout the said cutting portion and adherent to said metal support.

7. A thin abrasive saw as described in claim 6, wherein said abrasive grits consist entirely of diamond particles.

8. A thin abrasive saw comprising a thin metal support having parallel side surfaces interconnected by an elongated narrow edge, a cutting portion of constant width greater than the width of said metal support and of a predetermined minimum height symmetrically positioned on and electrolytically bonded to said thin metal support along said narrow edge and along adjacent portions of both of said side surfaces with the sides of the cutting portion parallel to the side surfaces of the thin metal support, said cutting portion consisting of abrasive grits disposed interdependently in continuous phase between the parallel side surfaces of the cutting portion whereby all of the abrasive grits immediately adjacent the side surfaces of said cutting portion have outermost extremities coincident with one of the side surfaces of said cutting portion, and an electrodeposited bonding metal in continuous phase enveloping said abrasive grits and adherent to said thin metal support.

9. A thin abrasive saw as described in claim 8, wherein said thin metal support is a disc and said cutting portion is located on the peripheral edge of said disc.

10. A thin abrasive saw as described in claim 8, wherein said thin metal support is an annulus and said cutting portion is located on the inner edge of said annulus.

11. A thin abrasive saw as described in claim 8, wherein said thin metal support is an elongated flat strip with at least one straight elongated edge and said cutting portion extends along a predetermined portion of said straight elongated edge.

12. A method of making a thin abrasive saw blade comprising supporting a thin metal support within and shielded by an electrically nonconducting structure with at least one edge of the metal support exposed below the outer surface of the structure so that the structure and the metal support together form an elongated cavity extending along the exposed edge of the support and at least to the depth of the exposed edge below the outer surface of the structure, depositing in continuous phase throughout the elongated cavity interdependent abrasive grits of smaller size than the width and depth of the elongated cavity, and simultaneously bonding the abrasive grits together and to the metal support by electrodeposition of a bonding metal at a rate limited so that the bonding metal is deposited throughout the space between and to the shape determined by the sides of the elongated caviyt.

13. A method of making a thin abrasive saw blade comprising supporting a thin metal support between electrically nonconducting plates respectively provided with identically shaped recesses facing one another which together with one edge of the support exposed therebetween from an elongated symmetrical cavity of greater width than the support extending along and at least to the depth within the elongated cavity, of the exposed edge, loading the entire elongated cavity with abrasive grits of substantially smaller size than the width and the minimum depth of the elongated cavity all interdependently disposed in continuous phase and bonding the abrasive grits together and to the support by electrodeposition of a bonding metal at a rate limited so that the bonding metal is deposited in continuous phase throughout the available space within the elongated cavity to the shape determined by the identically shaped recesses which form the sides of the elongated cavity.

14. A method of making a thin abrasive saw blade comprising clamping a thin circular metal support between electrically nonconducting circular plates shaped and positioned to coact with the metal support to form an annular cavity within which one edge of the support is exposed, filling the annular cavity with fine abrasive grits all interdependently disposed in continuous phase, engaging the edge of one circular plate with a complementary nonconducting body with a surface extending across the open side of the annular cavity and spaced a predetermined distance from the adjacent edge of the other circular plate, filling the space between the annular cavity and the nonconducting body with additional abrasive grits, and bonding the abrasive grits within the annular cavity together and to the exposed edge of the circular support by electrodeposition of a bonding metal at a rate limited so that the bonding metal is deposited throughout the space between and to the shape determined by the sides of the annular cavity formed by the nonconducting circular plates.

15. A method of making a thin abrasive saw blade comprising clamping a thin circular metal support between electrically nonconducting circular plates shaped and positioned to coact with the metal support to form an annular cavity within which the periphery of the metal support is exposed, filling the annular cavity with fine abrasive grits, interdependently disposed in continuous phase, engaging the periphery of one circular plate with a nonconducting ring with an inner surface extending across the open side of the annular cavity and spaced a predetermined distance from the periphery of the other circular plate, filling the space between the annular cavity and the ring with additional abrasive grits, and bonding the abrasive grits within the annular cavity together and to the exposed periphery of the circular metal support by electrodeposition of a bonding metal at a rate limited so that the bonding metal is deposited throughout the space between and to the shape determined by the sides of the annular cavity formed by the nonconducting circular plates.

16. A method of making a thin abrasive saw blade comprising clamping a thin annular metal support between electrically nonconducting annular plates shaped and positioned to coact with the metal support to form an annular cavity within which the inner edge of the metal support is exposed, filling the annular cavity with fine abrasive grits interdependently disposed in continuous phase, engaging the inner edge of one annular plate with a nonconducting plug with a peripheral surface extending across the open side of the annular cavity and spaced a predetermined distance from the inner edge of the other annular plate, filling the space between the annular cavity and the plug with additional abrasive grits, and bonding the abrasive grits within the annular cavity together and to the exposed inner edge of the annular metal support by electrodeposition of a bonding metal at a rate limited so that the bonding metal is deposited throughout the space between and to the shape determined by the sides of the annular cavity formed by the nonconducting annular plates.

References Cited by the Examiner

UNITED STATES PATENTS

| | | | |
|---|---|---|---|
| 2,360,798 | 10/1944 | Seligman et al. | 204—16 |
| 2,424,140 | 7/1947 | Beecher | 204—16 |
| 2,713,339 | 7/1955 | Sayers | 51—206 |
| 2,924,050 | 2/1960 | Barron | 51—405 |
| 2,978,847 | 4/1961 | Shoenmaker | 51—206 |
| 3,049,843 | 8/1962 | Christensen | 21—206 |
| 3,146,561 | 9/1964 | Lindblad | 125—15 X |

ROBERT C. RIORDON, *Primary Examiner.*

L. S. SELMAN, *Assistant Examiner.*